No. 803,871. PATENTED NOV. 7, 1905.
E. S. BROOKE & C. A. H. VAUGHAN.
LOCOMOTIVE BLOWER VALVE.
APPLICATION FILED JULY 17, 1905.
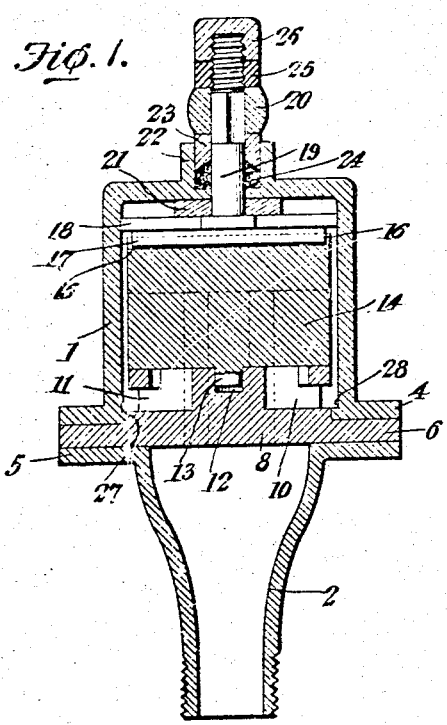
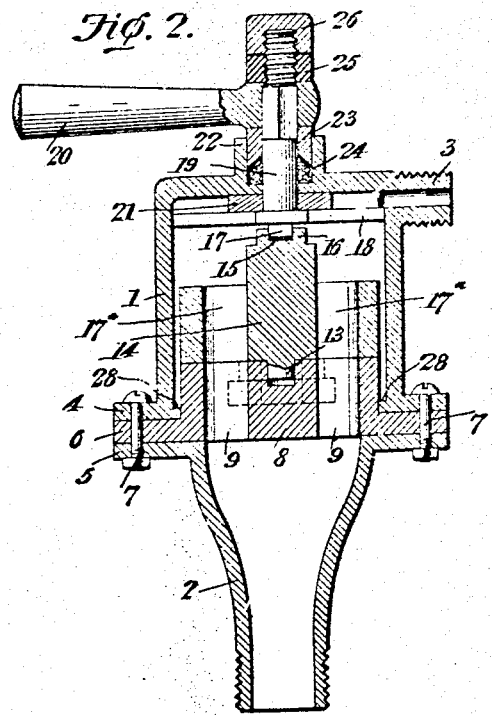
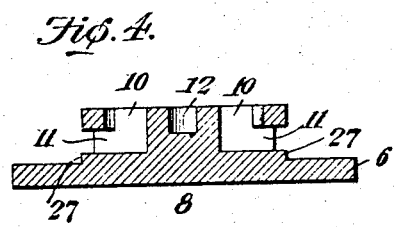
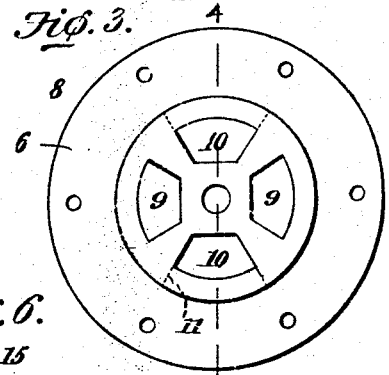
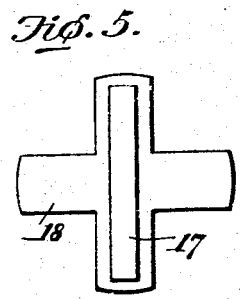
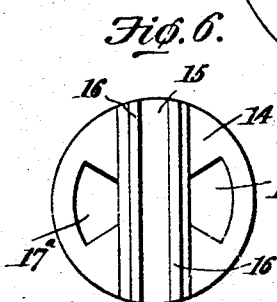
Edgar S. Brooke
Charles A. H. Vaughan
Inventors
Witnesses:
by C. A. Snow & Co.
Attorneys.

UNITED STATES PATENT OFFICE.

EDGAR STAPLETON BROOKE AND CHARLES A. H. VAUGHAN, OF ROANOKE, VIRGINIA.

LOCOMOTIVE-BLOWER VALVE.

No. 802,871.            Specification of Letters Patent.            Patented Nov. 7, 1905.

Application filed July 17, 1905. Serial No. 270,028.

*To all whom it may concern:*

Be it known that we, EDGAR STAPLETON BROOKE and CHARLES A. H. VAUGHAN, citizens of the United States, residing at Roanoke, in the county of Roanoke and State of Virginia, have invented a new and useful Locomotive-Blower Valve, of which the following is a specification.

This invention relates to locomotive-blower valves.

The object of the invention is to provide a valve of the character named which shall combine simplicity of construction, durability in use, and the maximum of efficiency with the minimum of danger of derangement in use.

With the above and other objects in view, as will appear as the nature of the invention is better understood, the same consists in the novel construction and combination of parts of a locomotive-blower valve, as will be hereinafter fully described and claimed.

In the accompanying drawings, forming a part of this specification, and in which like characters of reference indicate corresponding parts, Figure 1 is a view in vertical section through a blower-valve constructed in accordance with the present invention. Fig. 2 is a similar view taken at right angles to Fig. 1. Fig. 3 is a view in plan of the valve-seat. Fig. 4 is a transverse sectional view through the valve, taken on the line 4 4, Fig. 3. Fig. 5 is an inverted plan view of the valve-actuating member. Fig. 6 is a top plan view of the valve.

The valve embodies a two-part casing comprising a valve-chamber 1 and a pipe connection 2. The chamber 1 is provided in its upper end with a threaded extension 3, which constitutes a boiler connection, and with a marginal flange 4, the pipe connection being provided with a similar flange 5. Disposed within the chamber 1 is a valve-seat which comprises a marginal flange 6, through which pass the bolts or screws 7 that hold the casing and pipe connection assembled, and the valve-seat proper, 8. The valve-seat 8 is provided with two pairs of ports 9 and 10, of which the ports 9 extend entirely through the seat and discharge into the pipe connection, and the ports 10 terminate short of the bottom of the seat and are provided with lateral steam-receiving ducts 11. (Clearly shown in Fig. 4.) The upper face of the valve-seat is provided with a socket 12, which is designed to be engaged by a teat or stud 13, that projects from the lower side of the valve 14, the upper side of which is provided with a transverse seat 15, formed between two flanges 16, that is engaged by a fin or rib 17, carried by a combined spider-guide 18, which is secured to or integral with a spindle 19. The valve 14 is provided with two ports $17^a$, that are adapted to be brought into register with the ports 9, thus to establish free passage for the steam from the extension 3 down through the pipe connection and thence into the pipe-line.

The spindle 19 projects upward through the casing and carries at its upper end a handle 20, by which to effect turning of the spindle, and thus the valve, during which operation the spider 18 serves to hold the spindle centered relatively to the casing.

Interposed between the under face of the top of the casing and the spider-guide is a babbitt gasket 21 that operates to form a steam-tight joint in conjunction with the spindle and the under side of the head of the casing, thus to prevent the escape of steam upward.

The upper side of the casing is provided with a seat 22, in which is housed a gland 23, that is designed to bear upon a suitable packing 24, and thus further accentuate the steam-tight connection between the spindle and the casing. The gland is forced down upon the packing by a nut 25, that serves in the usual manner to cause the packing tightly to impinge the spindle, and the gasket 21 is drawn upward against the under side of the casing-head by the nut 25, a lock-nut 26, carried by the upper end of the spindle and bearing upon the nut 25, serving to lock the latter against accidental loosening.

Normally the ports 9 are covered by the solid portion between the ports $17^a$ of the valve; but when the handle 20 is turned these ports will gradually uncover, and thereby permit steam to escape through the pipe connection 2. At the same time the steam enters through the ducts 11 in the valve-seat and presses against the solid portion of the under side of the valve, and thereby operates to balance it and reduce wear on the seat to a minimum. This latter function is secured by enlarging the interior of the chamber 1 from its upper end down to a point in alinement with the lower wall 27 of the steam-receiving ducts, as shown at 28 in Figs. 1 and 2, so that a passage is provided to permit ingress of steam into the said ducts.

The blower will be thoroughly effective for the purposes designed and may readily be combined with a locomotive or other boiler already in use without requiring any change in the structural arrangement thereof.

Having thus described the invention, what is claimed is—

1. A locomotive-blower valve comprising a casing, a rotary valve arranged therein, and a valve-seat provided with downwardly-discharging ports for passage of steam without the casing, and upwardly-discharging ports to effect balancing of the valve, the casing being circumferentially enlarged to form a passage-way for the steam through the latter ports.

2. A locomotive-blower valve comprising a casing provided with a steam inlet and outlet, a rotary valve arranged in the casing and provided with ports, and a valve-seat having escape-ports and upwardly-discharging ports to balance the valve.

3. A locomotive-blower valve comprising a casing provided with a steam-inlet and steam-outlet, a rotary valve arranged in the casing and provided with a pair of ports, and a valve-seat provided with two pairs of ports, two of which are adapted to register with those of the valve, and the other two being provided with lateral steam-receiving ducts.

4. A locomotive-blower valve comprising a casing provided with a steam-inlet and steam-outlet, a rotary valve arranged in the casing and provided with a pair of ports, and a valve-seat provided with two pairs of ports, one pair of which is adapted to register with those of the valve and the other pair being provided with lateral steam-receiving ducts, the interior of the casing being circumferentially enlarged to form a passage-way for the steam to the said ducts.

In testimony that we claim the foregoing as our own we have hereto affixed our signatures in the presence of two witnesses.

EDGAR STAPLETON BROOKE.
CHARLES A. H. VAUGHAN.

Witnesses:
P. H. TUCKER,
RUSSELL J. WATSON.